Dec. 22, 1942.  K. GRUPP  2,305,771
MEANS FOR MEASURING THRUST
Filed July 22, 1939
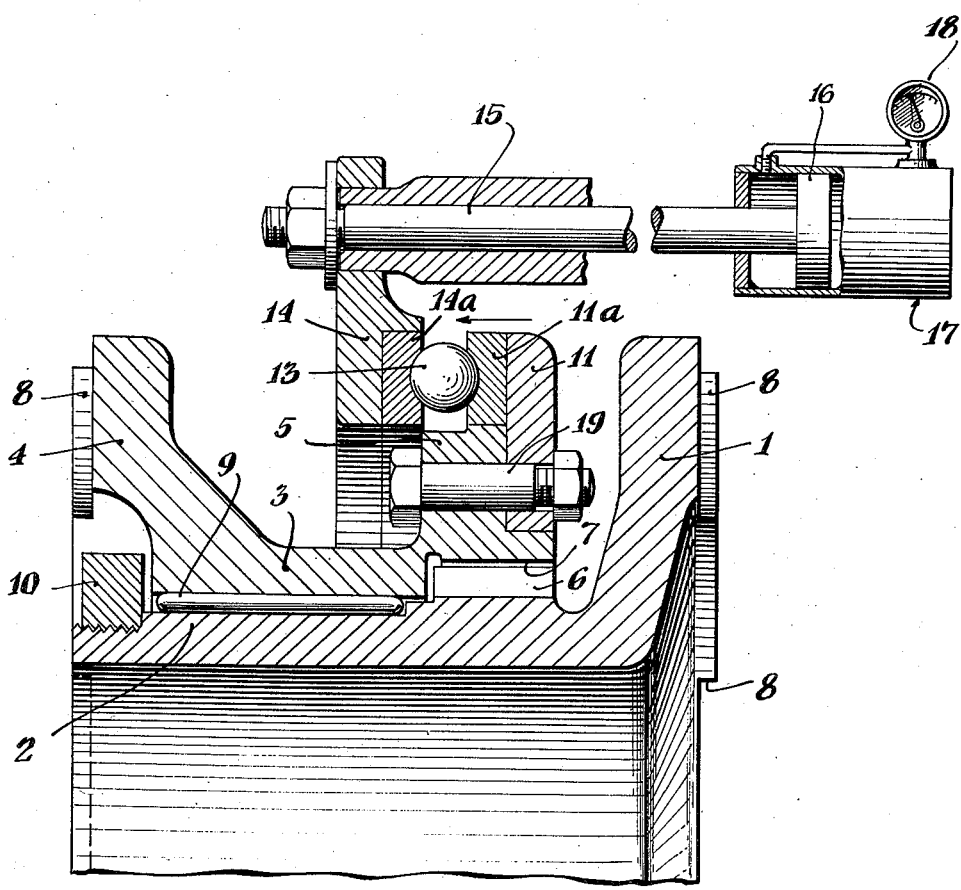
INVENTOR.
Karl Grupp
BY
ATTORNEYS Patented Dec. 22, 1942

2,305,771

UNITED STATES PATENT OFFICE 2,305,771

MEANS FOR MEASURING THRUST

Karl Grupp, Munich, Germany; vested in the Alien Property Custodian

Application July 22, 1939, Serial No. 285,881
In Germany July 22, 1938

1 Claim. (Cl. 265—1)

This invention relates to improvements in means for measuring thrust, and particularly to such devices especially adapted for measuring the axial thrust developed by propellers as for marine or aircraft use.

An object of the invention is to provide such a device so constructed that it may serve as an adaptor or intermediate device between the driving hub of a power plant and a propeller and may serve to measure the propeller thrust.

Another object is to provide such a device in which the thrust may be continually measured and indicated.

Another object is to provide such a construction in which the thrust may be measured and indicated whether it be positive or negative.

Further objects and advantages of this invention will be apparent from consideration of the specification as illustrated by the accompanying drawing of a possible embodiment of the invention, in which drawing:

The single figure is a partial axial cross-section of one form which the invention may take.

Referring to the drawing, the numeral 2 indicates a hollow shaft which is provided with a flange 1 formed with clutch jaws 8 adapted to interengage with similar jaws on the driving flange of the driving means such as an aeroplane power plant. The numeral 3 indicates a second hollow shaft telescopically arranged exteriorly of the shaft 2 and also formed with a flange 4 having similar coupling jaws 8 for receiving and driving a propeller of usual construction. 6 and 7 indicate spline members formed upon shafts 2 and 3 respectively, said splines being so interconnected as to permit slight axial movement relatively between shafts 2 and 3 but requiring that the said shafts rotate together. In order to reduce friction to a minimum, needle or roller bearing members 9 may be used. It is to be understood, of course, that instead of rollers, bearing balls might be used. It is also to be understood that bearing balls might be employed between the spline members 6 and 7 to reduce frictional resistance to relative axial movement to a minimum.

10 indicates a holding ring which may preferably be threaded upon shaft 2. As indicated, substantial play is provided between ring 10 and shaft 3 to permit the desired amount of axial movement.

In order to permit the measurement of the thrust, the enlargement 5 of shaft 3 is provided with a ring 11 attached thereto by suitable means such as bolt 19, and preferably provided with a hardened bearing race 11a between which and a bearing race 14a are bearing balls 13. The ring 14a is carried by a ring 14 which is slidably mounted for movement in an axial direction and which is provided with a piston rod 15. Said piston rod 15 connects with a suitable piston 16 in a cylinder 17 filled with fluid. Suitable conduits connect from said cylinder to an appropriate pressure measuring gauge 18 so calibrated as to show the thrust of the propeller in desired force units.

The ring 14 and connected parts are supported relative to the power plant against rotation but in such a way as to permit axial movement.

In those instances in which a time-thrust graph is desired, the thrust indicating means may be connected for operating a recording device which records the thrust forces continuously upon moving paper or other material.

If it is desired to measure the negative thrust, as when the propeller drives the motor, it is merely necessary to reverse the device shown and described above. If it is desired to measure not only the thrust developed by the application of power from the power plant to the propeller but also negative thrust, as, for example, when the propeller drives the motor, any suitable two-way acting thrust bearing may be used and the means illustrated and described thus far may be easily modified for that purpose. In that case, it is merely necessary that a second thrust bearing be provided on the opposite side of ring 11 and that the measuring apparatus be constructed to indicate and/or record movements in both directions.

The form of the invention shown and described above has the advantage that it is simple and cheap to construct and may be easily applied to and removed from aeroplane power plants to be tested.

The invention is not intended to be limited to the form shown, which is to be understood as illustrative only and not as limiting, as various changes in construction and arrangement may be made, all coming within the scope of the claim which follows:

In an apparatus for measuring propeller thrust adapted for insertion between a power plant and a propeller, which power plant and propeller are normally rigidly connected together by interengaging clutch members, the combination of two rotatable members, means intermediate said members permitting relative sliding motion but preventing relative rotation therebetween, one of said members being formed with means complementary to and directly interengageable with the said interengageable clutch member on the driving shaft of the power plant, and the other of said members being formed with means complementary to and directly interengageable with the interengaging clutch member on the propeller, a circular flange attached to and extending radially from said other rotatable member, said flange being provided with a ball-bearing race on one end face, an axially movable, non-rotatable thrust-responsive device having an inwardly extending circular flange provided with a ball-bearing race on one end face in juxtaposition to the race on the flange of said other member, and bearing balls intermediate said races, whereby axial movement of said other rotatable member due to changes in thrust between said propeller and engine is transmitted to said thrust-responsive device to shift the same as a measure of such thrust changes.

KARL GRUPP.